United States Patent

[11] 3,558,079

| [72] | Inventors | Loren E. Curriston |
| | | La Habra; |
| | | Heinz Fornoff, Glendale, Calif. |
| [21] | Appl. No. | 664,497 |
| [22] | Filed | Aug. 30, 1967 |
| [45] | Patented | Jan. 26, 1971 |
| [73] | Assignee | North American Rockwell Corporation |

[54] MANEUVERING SPACE VEHICLES
23 Claims, 8 Drawing Figs.
[52] U.S. Cl. ............................................. 244/1, 244/4
[51] Int. Cl. ............................................. B64g 1/20
[50] Field of Search ............................................. 244/1, 4, 4.1; 280/1.6

[56] References Cited
UNITED STATES PATENTS
2,509,603   5/1950   Marin ............................. 60/35.54
3,136,279   6/1964   Boatwright ..................... 244/4.1X
3,381,917   5/1968   Moore et al. ..................... 244/4

OTHER REFERENCES
Aviation Week & Space Technology, June 25, 1962, Pages 56, 57

*Primary Examiner*—Milton Buchler
*Assistant Examiner*—Jeffrey L. Forman
*Attorneys*—William R. Lane and Allan Rothenberg

ABSTRACT: A maneuvering space vehicle providing automatic attitude control, propulsion, life support, and communication for an astronaut in a zero gravity environment. The apparatus includes (a) a backpack containing devices for performing these functions and (b) a control unit connected with the backpack and spaced forwardly thereof for reception of the astronaut therebetween. A plurality of thrusters are mounted on the housing and on the control unit to provide six degrees of motion, i.e., translational thrust along three axes and torque about three axes.

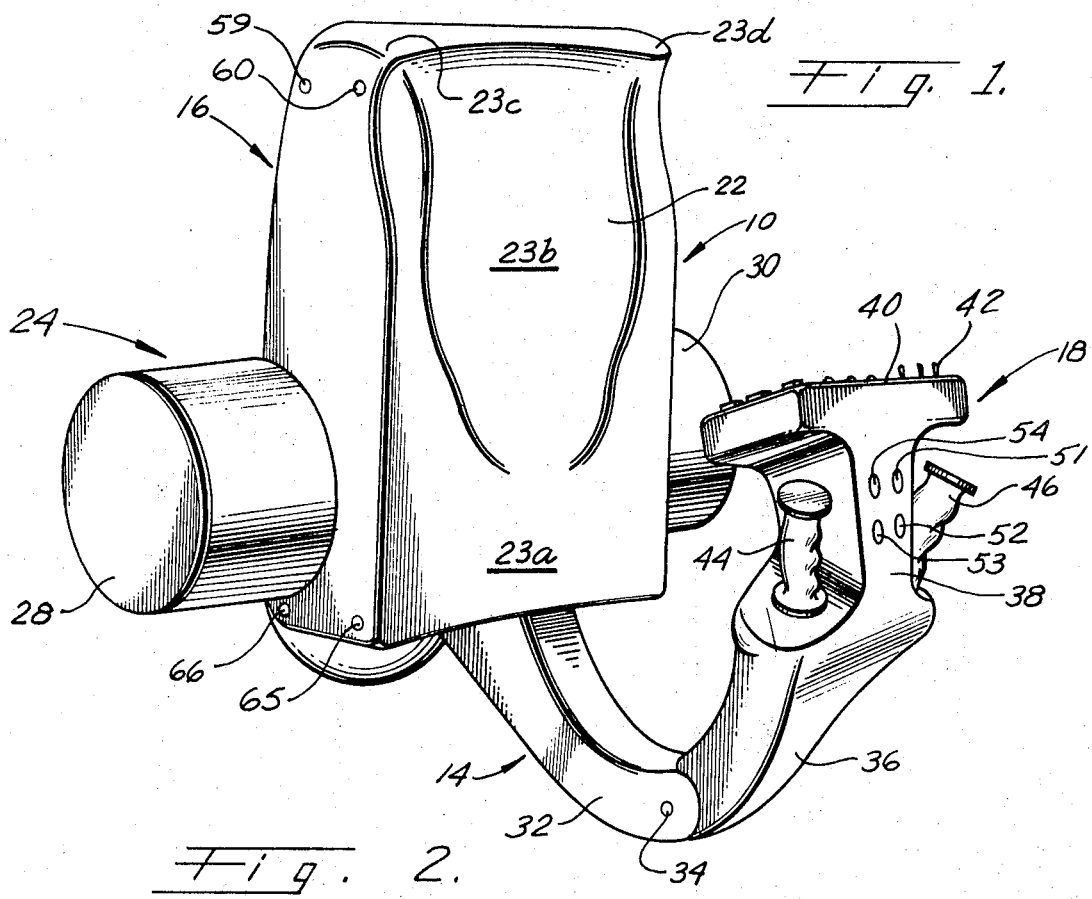
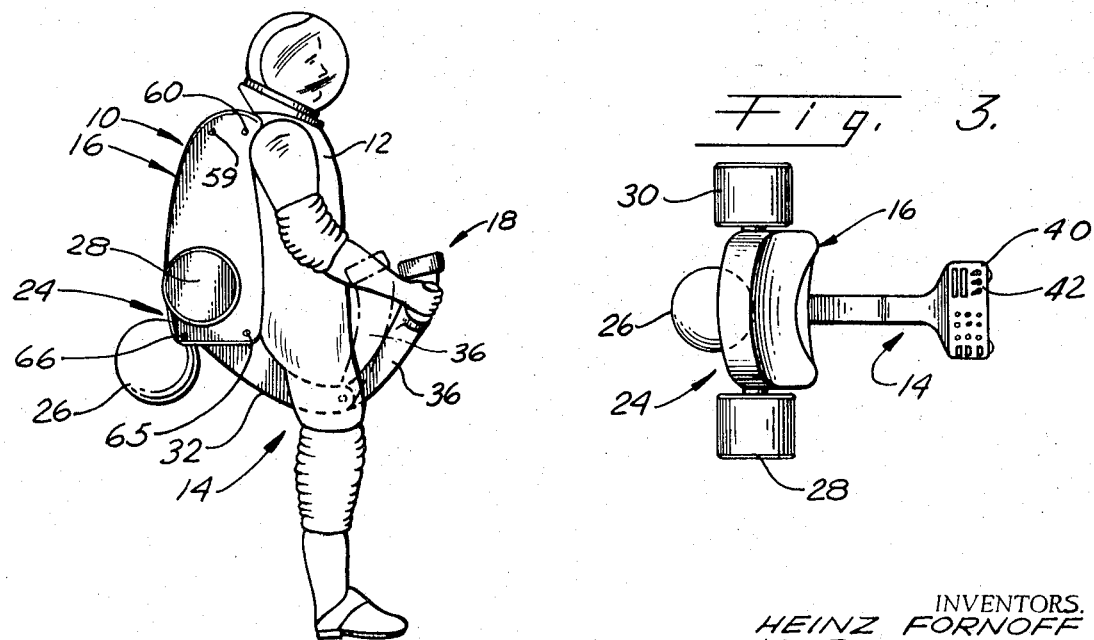

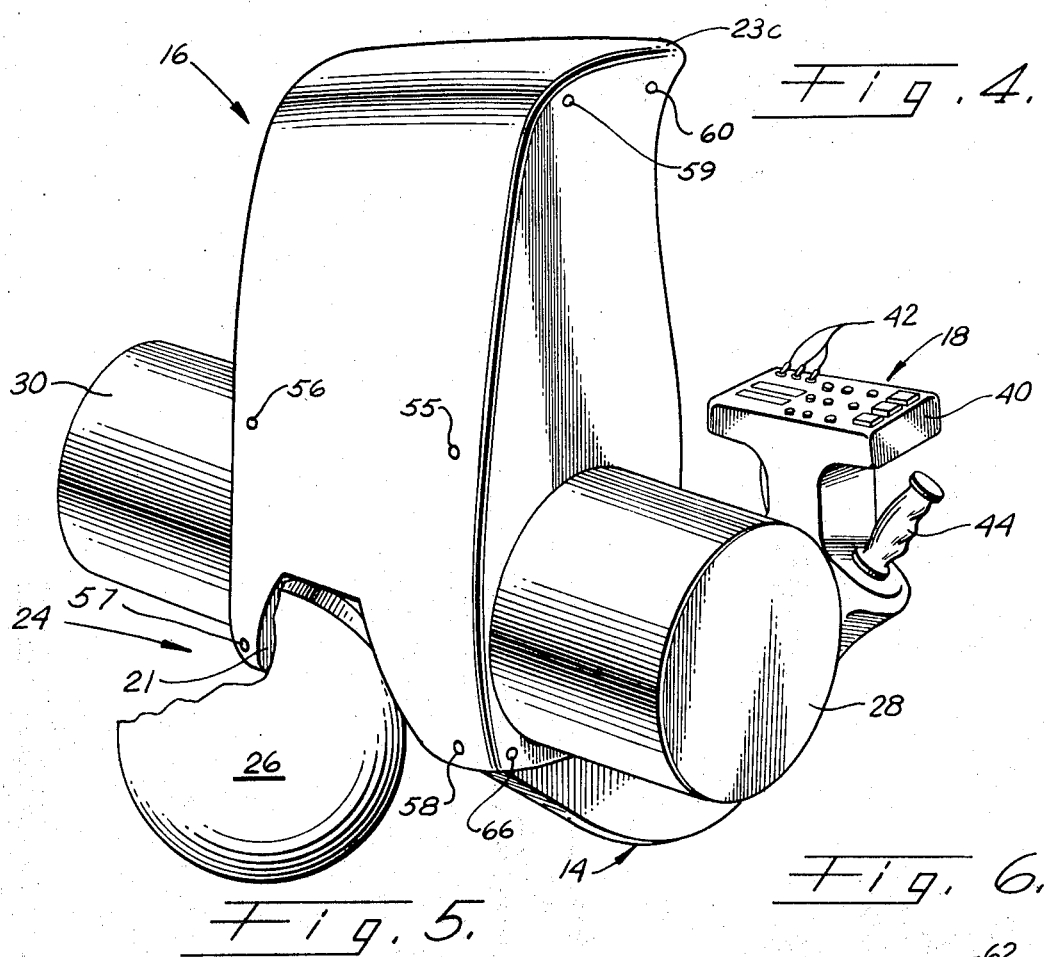
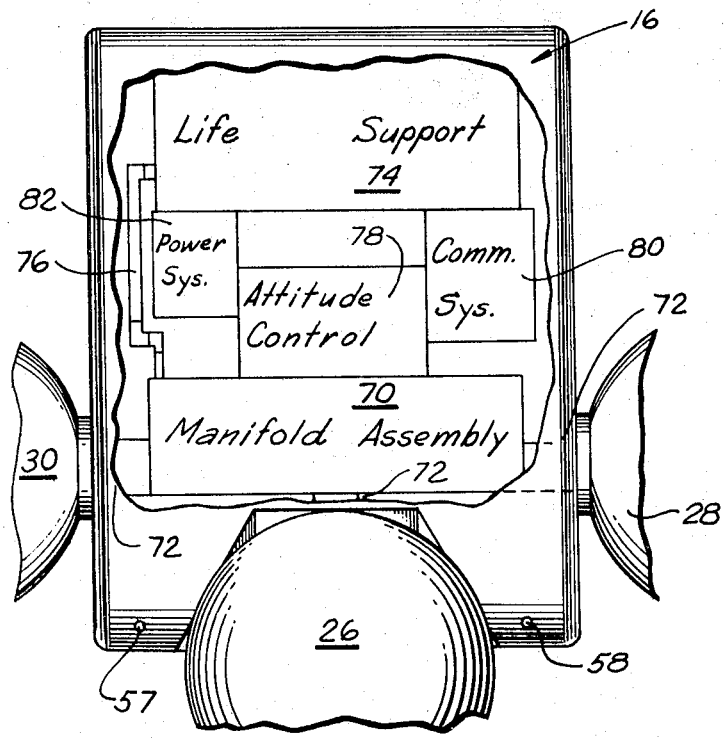
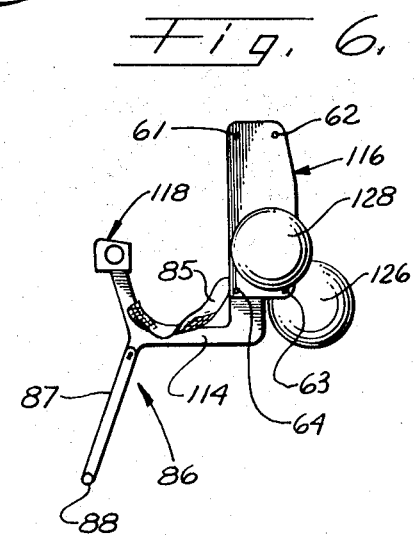

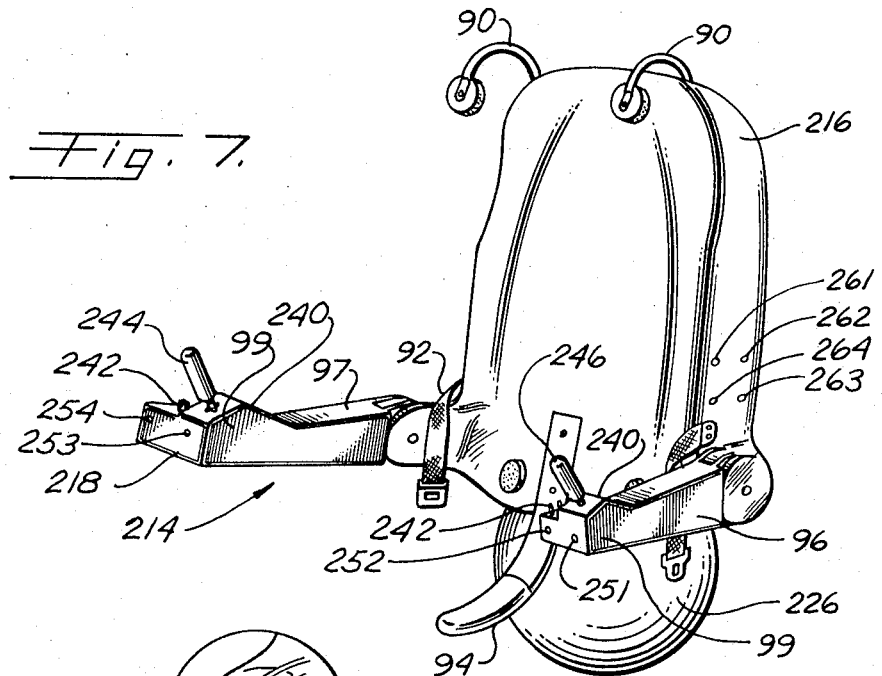

MANEUVERING SPACE VEHICLES

BACKGROUND OF THE INVENTION

The present invention relates to maneuvering vehicles and more particularly to a maneuvering vehicle capable of meeting propulsion, stabilization and orientation, life support and communication requirements of an astronaut in a zero or reduced gravity environment.

Astronauts recently have been placed into orbit around the earth enclosed within a relatively small capsule and have experienced a zero gravity environment therein. While in this confined enclosure, the astronaut has little difficulty in maneuvering his body about the capsule to perform his required tasks. However, in the near future astronauts will be required to exit the confines of his spacecraft to perform extra-vehicular activities such as assembly of structures, repair of space stations, inspection of objects, performance of experiments, and rescue of disabled or stranded astronauts.

For an astronaut to translate in extra-vehicular space from one point to another, he must impart velocity increments to himself. While this can theoretically be accomplished by "pushing-off" relative to a spacecraft, such a technique is not considered practical due to the inherent inaccuracy of the resultant velocity vector's direction and the resultant error cannot be corrected during the transfer without some form of a propulsive device. Thus, propulsion must be provided even if the "push-off" technique is employed.

Having equipped the astronaut with a propulsive device necessitates provision of two additional capabilities: (a) the astronaut must be able to control thrust direction and (b) he must be able to eliminate and/or counteract any torques produced by the thrusters as a result of the thrust-vector not passing through his center of mass. The latter capability is a stabilization function and is essential if the astronaut is to be kept from tumbling. These stabilization functions can be provided generally in two different ways; (a) the attitude and/or rate can be sensed by the astronaut and he can command the corrections himself, and (b) the attitude and/or rate can be sensed by appropriate sensors with corrective torquing initiated automatically. These two approaches are often referred to as "systems without stabilization" and "systems with stabilization" respectively. In actuality both are stabilized systems with the difference being the means by which stabilization is provided; in the second case stabilization is achieved by means of an automatic feedback loop, while the first approach, the astronaut himself is part of the feedback loop. Accordingly these systems will be referred to as "automatic" vs "manual" stabilization schemes.

Prior astronaut maneuvering devices include a fingertip thruster described in U. S. Pat. No. 3,107,09, a spacebelt disclosed in U. S. Pat. No. 3,0,887, and a handgun described in U. S. Pat. No. 3,270,98. All three devices incorporated "manual" stabilization schemes without "automatic" means.

An "automatic" system requires rate or position sensing devices such as gyros, and associated feedback electronics, whereas in a "manual" system these hardware items are omitted. This advantage in somewhat reduced system complexity is offset by three disadvantages inherent in a "manual" system. The first disadvantage is that man is an inconsistent and subjective evaluator of required control torque magnitude and duration, thus resulting in greater propellant consumption; the second disadvantage is that the task of operating such a "manual" system is quite difficult and energy consuming; the third disadvantage is that for certain extra-vehicular tasks, such as photography of space objects, it is desirable to have both hands of the astronaut free on a temporary basis; with a "manual" system this is not possible since near zero angular rate can not be attained in practice.

In addition to the propulsion and stabilization requirement, the astronaut must be insulated from the hostile conditions of space, and be surrounded by an habitable environment which sustains him, and permits him to function in a near-normal manner. His space suit provides him with a container, but a life support system is needed to provide a breathable atmosphere, a tolerable temperature, and means for removal of waste products and contaminants. Additionally a communication system is necessary to provide voice communication and to monitor the status of the astronaut's life support equipment, propulsion system, and the astronaut himself to detect out-of-tolerance variations at their inception and to enable immediate initiation of appropriate corrective action. Finally a maneuvering space vehicle equipped to perform the above functions must be safe, reliable, compact and capable of operation over an extended period of time.

SUMMARY OF THE INVENTION

In carrying out the principles of this invention according to a preferred embodiment thereof, there is provided a system housing having operating equipment such as stabilization, life support, fluid storage devices mounted thereto, a control unit carrying control elements for operation and monitoring of said devices, a structural assembly connecting the control unit to the housing at a distance from the housing to receive a vehicle operator therebetween, and a plurality of nozzles on the vehicle and connected with the fluid storage devices under control of the control unit for applying force to the vehicle through 6 degrees of motion, including nozzles mounted on said control unit and the housing to provide selectively controlled combinations of thrust vectors.

This embodiment locates the system housing at the back of the astronaut since this "backpack" configuration has the advantages of not obstructing the astronaut's forward working area and enables the astronaut to freely move his legs and arms. Further, this configuration provides for location of nozzles conveniently distributed around the combined center of mass of the astronaut and his vehicle. The described embodiment preferably utilizes gaseous oxygen or a breathable mixture of gas as propellant since this allows utilization of common tankage and pneumatic components for both propulsion and life support systems. Further, the use of a cold gas propulsion system offers no hazard from exhaust plume impingement.

The control unit comprises a support secured to the structural assembly, display panels carried by the support, control switches mounted on the display panel, and a pair of control handles for commanding vehicle rotation or translation. With this arrangement efficiency of packaging and operations is optimized since the control unit performs a variety of different and uniquely interrelated functions. The control unit also provides a convenient location for forward and/or lateral facing fluid expulsion nozzles. Thus maximum flexibility of arrangement of nozzles is provided to enable a number of selectively controlled combinations of thrust vectors for stabilization and propulsion in 6 degrees of motion.

The structural support provides the necessary connecting means between the control unit and the housing, and the support means for a seat member and a footrest. Further, if deemed necessary or desirable, the structural support provides convenient location for the downwardly and sidewardly firing nozzles. The footrest provides the astronaut with a "home" for his feet, thus eliminating a dangling, free floating situation. This helps to maintain the vehicle center of mass reasonably constant and minimize thrust vector misalignment during translational maneuvers.

DRAWINGS

Other objects, advantages and features of the invention, both as to its construction and mode of operation will be readily appreciated as the same becomes better understood by reference to the following detailed description, when considered in connection with the accompanying drawings in which:

FIG. 1 is a perspective view of the front of an embodiment of the present invention;

FIG. 2 is a side view of the embodiment of FIG. 1 supporting an individual;

FIG. 3 is a top view of the embodiment of FIG. 1;

FIG. 4 is a perspective view of the rear of the embodiment of FIG. 1;

FIG. 5 shows the locations of the equipment mounted inside the housing of the embodiment of FIG. 1—5;

FIG. 6 is a side view of a modified embodiment having a seat member and footrest;

FIG. 7 is a perspective view of another embodiment of the present invention; and FIG. 8 is a side view, with operator, of the embodiment shown in FIG. 7.

DETAILED DESCRIPTION

Referring to the drawings wherein like reference numerals refer to like parts throughout, there is shown in FIGS. 1 and 2 a maneuvering vehicle 10 supporting an individual or vehicle operator 12 according to the present invention. As the invention is especially suitable for use in a gravity free environment found in free space, the vehicle operator is represented as an astronaut who is strapped or otherwise suitably secured by conventional strap, harnesses or the like (not shown) to a maneuvering vehicle structural assembly 14 and to a substantially rectangular housing 16. The structural assembly 14 is removably, but fixedly, mounted at one end to the housing 16 and at the other end fixed to a control unit 18.

The housing 16 is made of aluminum or other material suitable for use in the space environment and has a recessed lower rear portion 21 (FIG. 4), and a forward wall surface 22 (FIG. 1) contoured to fit the back of the vehicle operator. The forward surface 22 includes a lower portion 23a of a relatively small transverse curvature, and upper section 23b of greater curvature, and upper forwardly projecting corner portions 23c and 23d to receive the shoulders of the vehicle operator. Shown in FIGS. 1 through 4 in a fluid supply system 24 comprising three tanks including a spherical tank 26 connected to the housing structure partly within the recessed portion 21 near the bottom of the rectangular housing, and a pair of cylindrical tanks 28 and 30 similarly connected to the housing structure through the lower portion of the two sides of the housing 16. Preferably all tanks are substantially symmetrically disposed about the housing since this arrangement minimizes change in the vehicle center of mass when fluid is used simultaneously from the tanks. Although three tanks of specific shapes are described, a larger or smaller number of tanks of similar or different geometric configurations may be used depending on the propellant and life support requirements of a particular mission.

The structural assembly or support means 14 connecting the housing 16 and the control unit 18 is a hollow like member that houses pneumatic hoses, control linkage, and electrical harnesses (not shown) extending between the housing and the control unit, and it is suitably constructed and shaped to receive an astronaut thereon. As shown in FIGS. 1 and 2, the structural assembly 14 includes a first member 32 detachably but fixedly secured to the forward lower part of the housing 16 and extending downwardly and forwardly for connection by means of a pivot 34 to a movable second member 36 that is normally locked in the position illustrated in solid lines in FIG. 2 of the drawing, wherein it extends upwardly and forwardly from the forward end of first member 32 to properly position the control unit 18 which is secured to an enlarged laterally extending end portion of the second member 36. In order to permit the vehicle operator to closely approach another vehicle, piece of equipment, or the like, a latch (not shown) for pivot 34 is released and the second member 36 is moved to the dotted line position of FIG. 2. For several applications the structural assembly 14 including flexible lines such as pneumatic hoses and electrical harnesses may be mechanically removable from the housing by the use of suitable connecting means thus easing the requirement for storage in a parent spacecraft.

The control unit 18, as shown in FIGS. 1 through 4, has a support member 38 secured to and upstanding from a midsection of the enlarged portion of the second member 36 of the structural assembly 14. A display panel 40 secured to and carried by the support member 38 extends laterally on both sides thereof and is used to display various data related to vehicle and operator. The display panel 40 is provided with back light for intervals in which no sun light is available. In addition, control switches 42 are mounted on the display panel 40 for the operation of various vehicle systems. In addition to the display panel 40 and support member 38, the control unit 18 includes control handles 44 and 46 which are mounted at either side of the enlarged portion of member 36 and extend therefrom toward the laterally extending portions of the display panel 40. These control handles are used to command vehicle rotations or translations as described more particularly hereinafter.

As shown in FIGS. 1, 2, 4, and 6, a plurality of fluid expulsion nozzles 51 through 66 are mounted on the housing 16, and on the control unit 18 to provide the necessary propulsion means. This vehicle configuration allows the fluid expulsion nozzles be distributed around the maneuvering vehicle center of mass to provide 6 degrees of motion, i.e., translational thrust along three axes and torque about three axes. To provide this 6 degrees of freedom capability, a variable number of reaction nozzles may be used. However, this embodiment employs sixteen such nozzles (51 through 66) arranged into two sets of eight nozzles each, with Set A employing nozzles designated by odd reference numerals and Set B employing nozzles designated by even reference numerals. Normal operating mode is with both sets in use; in case either set is turned off, the remaining set can provide the required three axes of translational thrust and the three axes of torque at a reduced level. For example, as shown in FIG. 1, forward facing fluid expulsion nozzles 51 through 54 are mounted on the support member 38 of the control unit 18. Nozzles 51 and 53 are part of Set A; while nozzles 52 and 54 are part of Set B. Normal operation mode used all four forward facing nozzles for vehicle backward (−X) translations; however, in case either Set A or Set B is turned off, the remaining two forward facing nozzles (51 and 53 or 52 and 54) can provide a reduced thrust to accomplish the desired translational maneuvers.

Fluid nozzles used for vehicle forward (+X) translation include backward facing nozzles 55 through 58 which are mounted on the back wall of the housing 16 as shown in FIG. 4. These four nozzles are similarly grouped in pairs with nozzles 55 and 57 being part of Set A, while nozzles 56 and 58 being part of Set B. Nozzles 59 and 65 of Set A and/or nozzles 60 and 66 of Set B, mounted on the right sidewall of the housing 16, are used for moving the vehicle to the left (−Y axis translation); while nozzles 61 and 63 of Set A and/or nozzles 62 and 64 of Set B, mounted on the left sidewall of housing 16 (shown in FIG. 6) are used for moving the vehicle to the right (+Y axis translation).

In addition to providing translational thrust along three axes, nozzles 51 through 66 also provide rotational thrust about three axes. For example, to achieve a vehicle roll left motion, nozzles 61 and 65 of Set A and/or nozzles 62 and 66 of Set B can be employed. Similarly nozzles 59 and 63 and/or nozzles 60 and 64 can be used to achieve a vehicle roll right motion. For obtaining a vehicle pitch up motion, nozzles 51 and 57 and/or nozzles 54 and 58 can be actuated; while in the same manner, a vehicle pitch down motion is achieved by using nozzles 53 and 55 and/or nozzles 52 and 56. If a vehicle yaw right motion is desired, it can be obtained by using nozzles 53 and 57 and/or nozzles 54 and 56. Further a vehicle yaw left motion can be achieved by employing nozzles 51 and 55 and/or the pair of nozzles 52 and 58.

The fluid expulsion nozzles 51 through 66 are arranged in pairs and are fixed to locations on the housing 16 and on the control unit 18 so as to provide translational thrust through the maneuvering vehicle center of mass to enable an astronaut to translate nearly without rotation and to provide torque with substantially no resultant translation. Further this vehicle configuration allows proper placement of reaction nozzles 51 through 66 to direct expulsion fluid nozzle exhaust away from the vehicle operator and the vehicle itself thus avoiding hazard from plume impingement if the exhaust is hot, dirty or corrosive.

The housing 16, as shown in FIG. 5, has mounted therein a manifold assembly 70 which serves as a structural support and means for fluid distribution. The containers or tanks 26, 28, and 30 are each secured to the manifold assembly 70 through openings in the housing 16 by connecting means 72. Operationally, the propellant is stored in containers 26, 28 and 30, and the propellant flows to reaction nozzles 51 through 66 through pressure regulators (not shown), connecting means 72, and manifold assembly 70. The manifold assembly 70 serves as a distributor and controller by directing propellant to the appropriate nozzles in response to command from the vehicle operator through the positioning of control handles 44 and 46. Motion of the control handles operates control linkage, electrical or mechanical, or cables (not shown) to effect actuation of valves (not shown) in distributor 70. Rotations can be commanded by moving the right hand control handle 44 in the appropriate direction to effect operation of selected groups of nozzles 51 through 66 which are mounted on the housing 16 and on the control unit 18 as shown in FIGS. 1, 2, 4, and 6. For example, motions of control handle 44 for achieving roll right, roll left, yaw right, yaw left, pitch up, and pitch down rotations are pull axially down, push axially up, pull backward, push forward, rotate clockwise, and rotate counterclockwise respectively. Translations can be commanded by moving the left hand control handle 46 in the appropriate direction thereby selectively directing propellant to the proper combination of reaction nozzles 51 through 66 to provide the desired translational thrust. For example, pushing handle 46 forward would result in the vehicle moving ahead; while pulling the same handle backward would result in the vehicle moving backward. Similarly, motions of handle 46 for achieving vehicle up, down, left, and right translations are push up, pull down, push in and push out respectively. Obviously other handle motions may be employed.

Details of the control handles 44 and 46 and the connecting linkage operated thereby, are not part of this invention. The handles provide three axes control signals for operation of the nozzles by control of valves in distributor 70. They are of conventional construction well known in the art, such as, for example, the mechanism described in U.S. Pat. No. 3,028,126 for Three Axes Controller.

As shown in FIG. 5, the housing 16 has mounted therein a life support system 74 to be connected to the space suit of the astronaut to provide a breathable atmosphere, a tolerable temperature, and means for removal of waste products and contaminants. The life support system, specific details of which are not part of this invention, may be a conventional one such as the Portable Life Support System produced by the Hamilton Standard Company or the Portable Environmental Control System manufactured by the Air Research Company or various combinations of both systems. Breathable gas supply to the life support system 74 comes from fluid containers 26, 28, and 30 through manifold assembly 70 to which the life support system is connected by connecting duct 76. This embodiment preferably uses a cold gas such as oxygen or a breathable gas mixture as propellant since a breathable gas mixture allows the utilization of common tankage and pneumatic components for vehicle propulsion and vehicle operator life support. Further, the use of a cold gas offers no hazard from propulsion exhaust plume impingement.

As shown in FIG. 5, an automatic attitude control system as schematically indicated at 78 is mounted on the manifold assembly 70 for the purpose of the maneuvering vehicle stabilization. An automatic attitude control system, details of which are not shown, may be the type that comprises a sensor such as a gyroscope to detect motion and convert such motion into electrical signals that are applied to various devices such as reaction nozzles 51 through 66 that apply opposing or minimizing forces to stop the motion thus stabilizing and orienting the maneuvering vehicle in space. The use of an automatic attitude control system of the type described in Application Ser. No. 490,796 filed Sept. 28, 1965 for Stabilization-Orientation System where the gyros are used both to sense rotations, as is required in any automatic attitude control system, and to control such rotations, is preferred because of its size, weight, and volume advantages.

As disclosed in above identified U. S. Pat. Application, a system for controlling roll, pitch, and yaw of a vehicle comprises three sets of two gyros each with each pair of gyros sensing torque and commanding and controlling rotations about one axis. The gyros of each pair are mechanically interconnected and oriented such that in the neutral position their spin axes are opposing each other. With all three gyros pairs oriented neutrally there is no net angular momentum in the system; when the appropriate pair of gyros senses an external torque acting on the maneuvering vehicle about the respective input axes, they precess so as to absorb the momentum which has been applied to the system. Thus, the angular velocity of the maneuvering vehicle remains zero, although the net angular momentum of the system including gyros equals the momentum input of the external torque.

Conversely, with all gyros in a neutral position; if a rotation is desired about any axis the gyros of an appropriate pair are mechanically torqued and caused to precess. The net momentum vector of the gyro pair is in the direction in which they were torqued. Since no external force was applied to the system, the torque is an internal one, the system must still have zero net momentum. The result is that the vehicle body rotates in the direction opposite to that in which the gyros were torqued. The speed of rotation of the body depends on the net momentum transfer of the gyro pair, which is a function of their position, which, in turn, is a function of the amount of torque applied to them to cause momentary transfer. The limit of the angular velocity possible with gyros alone is reached when the control torque causes them to precess to a mechanical stop. This internal torque to the gyro pairs is achieved by a system comprising the control handle as indicated at 44 of FIG. 1, and a linkage (not shown) connecting the control handle and the gyro pairs for causing the gyro pairs to change their angular relationship upon movement or positioning of the control handle. Other mechanical or electrical means capable of similar performance may also be employed.

The Stabilization-Orientation System as described in the above identified application and as used in the present embodiment is designed so that when any pair of gyros has precessed through a gimbal angle of, for example, 45 degrees an electrical switch is closed, and torque generating means such as fluid expulsion nozzles 51 through 66 are commanded to correct the condition which exists. Thus, reaction nozzles 51 through 66 are activated to aid the rotation when the gyros have precessed to the switch as a result of a rotation command, or to oppose the rotation when the gyros have precessed to the switch as a result of absorbing an external torque. Therefore a feature of the described arrangement is the utilization of command reaction nozzles 51 through 66 for the purpose of propulsion and vehicle stabilization in cooperation with the gyros.

In addition to affording a structural support for the automatic attitude control system 78 and the fluid supply system 24, the manifold assembly 70, shown in FIG. 5, serves as a distribution system directing fluid to the appropriate reaction nozzles 51 through 66 and the life support system 74. This arrangement allows the manifold assembly 70 to perform a heat exchange function by making use of the heat from the life support system 74 and the automatic attitude control system 78 to increase the efficiency of the propulsion equipment. This also permits the stored gas to act as a coolant to aid temperature control of the life support system 74, the automatic attitude control system 78, and other equipment in the housing 16.

A communication system as schematically indicated at 80 utilizing conventional transducers, data processors, transmitters, and receivers (not shown) is provided in the housing as part of the vehicle operational equipment to monitor the status of the astronaut and the vehicle systems, and to provide voice and telemetry contacts with the parent spacecraft and/or the ground stations. Critical data on the status of the astronaut and the vehicle systems such as tank pressure, and power supply status are displayed on the display panel 40 in front of the astronaut as shown in FIGS. 1 through 4. In addition, as shown in FIG. 5, a power system 82 having batteries as the energy source and a power distribution module are mounted within the housing to provide the necessary power and distribution means to operate the various vehicle systems. This feature of providing a common power supply for all vehicle system helps to keep the vehicle volume and mass to minimum.

The embodiment of FIG. 6 comprises a contoured back pack housing 116, a control unit 118, an interconnecting structural assembly 114, and fluid tanks affixed to the housing, all constructed and arranged in a fashion generally similar to that described in connection with the corresponding structure of FIGS. 1 through 5. The back pack 116 includes substantially the same equipment as described in the first embodiment. In this arrangement, however, all three tanks, of which only two are shown, 126 and 128, are cylindrical. The structural assembly 114 is formed in this arrangement in a single unit having a depending portion integral with the forwardly extending portion. A contoured seat member 85 is mounted on assembly 114 for vehicle operator and provides a fixed location for him with respect to the vehicle. The seat member is mounted for vertical adjustment by suitable means, not shown, to provide for adjustment of the vehicle-astronaut center of mass.

The footrest 86 is pivotally attached to the bottom of the structural assembly 114 and extending downward therefrom to provide a "home" for the astronaut's feet thus helping to keep any shift in the vehicle-operator center of mass to minimum which in turn minimizes thrust vector misalignment during translational maneuvers. The footrest 86 is detachable at its pivotal connection for storage in the parent spacecraft and can be folded back out of the way for tasks which require the astronaut's legs and feet be free. Suitable latching devices (not shown) are provided to secure the footrest in an adjusted position. Foot pedals 88 are hingedly connected on pivots (not shown) to the bottom of the footrest main member 87 for rotation through 90° to a storage position.

In addition to providing a structural support for the seat member 85 and the footrest 86, the structural assembly 114 serves as a connecting means between control unit 118 and housing 116. Since structural assembly 114 is a hollow tube like member, it is also used to house electrical and mechanical connections such as pneumatic hoses, control linkage, and electrical harnesses between control unit 118 and housing 116. The control unit 118 of FIG. 6 comprises a relatively small rectangular structure having control handles mounted thereto and extending sidewardly therefrom; the control unit also includes display equipment and control switches that are secured to and carried by the rectangular structure, substantially as described heretofore. Other vehicle parts shown in FIG. 6, such as the housing and fluid containers are, as indicated, constructed and arranged as shown in FIGS. 1 through 5.

Another embodiment of this invention designed for shorter duration extra-vehicular activities is shown in FIGS. 7 and 8 wherein a vehicle operator 12 is secured to a housing 216 by shoulder hooks 90 and body straps 92, and suitably supported on the maneuvering vehicle body support member 94 fixed to and extending forwardly from the middle lower portion of housing 216. The rectangular housing 216 has mounted thereon, through an opening in a recess of its lower middle section, a spherical tank 226 which is equipped with an internal pressure regulator (not shown) to reduce the high fluid storage pressure to low safe interface pressure at a connecting means (not shown) between the tank 226 and the housing 216.

In addition to spherical tank 226, the housing has connected thereto a structural assembly 214 which has two furcations or extension members 96 and 97. Furcation 97 is pivotally mounted on the lower portion of the right side of the housing 216 and extends forwardly therefrom; while furcation 96 is similarly mounted on the lower portion of the opposite side. Connected to the other end of this bifurcated structural assembly 214 is a control unit 218 having a portion secured to each end of the furcations 96 and 97. Secured to the forward end of each furcation are supports 99 which carry display meter 240 and control switches 242. In addition, control handles 244 and 246 used to command vehicle rotations or translations are mounted on and upstanding from supports 98 with handle 244 secured to the right furcation 96 and handle 246 secured to the left furcation 97.

A plurality of fluid expulsion nozzles 251 through 266, only twelve of which are shown, are mounted on the control unit 218, and on the housing 216. This arrangement also allows the nozzles to be distributed around the maneuvering vehicle center of mass to provide 6 degrees of motion, i.e., translational thrust along three axes and torque about three axes. These reaction nozzles or thrusters are also arranged into two sets and in pairs as described previously. This configuration also allows proper placement of fluid expulsion nozzles so as to avoid exhaust plume impingement hazards and the use of gaseous oxygen or a breathable gaseous mixture as propellant also offers advantages as stated in the preceding paragraphs. Since furcations 96 and 97 are pivotally mounted on the housing 216, the side arms can be folded upwardly against housing 216 for storage.

Housing 216 of FIGS. 7 and 8 contains apparatuses for propulsion, automatic attitude control, life support, and communication functions as previously described. The arrangement and location of equipment within the housing is similar to the arrangement shown in FIG. 5 as described above.

Although particular embodiments of the invention has been shown and disclosed herein, it is evident that numerous variations and modifications embodying the essential structural and human engineering features may be made. For example, in order to carry larger quantities of propellant or to reduce the size of the unit, it may become necessary to remove the propellant tanks and substitute in place thereof a flexible hose connecting the propellant supply of the parent spacecraft at one end and the maneuvering vehicle at the other end.

Likewise, the maneuvering unit can be remotely controlled by inclusion of a radio command receiver to perform maneuvers in accordance with commands received from the parent spacecraft or the ground stations. Further, other changes such as the number of fluid expulsion nozzles and shape of the vehicle may be made. The disclosed invention is therefore intended to cover all such changes and variations as lie within the spirit and scope of the invention.

We claim:
1. A vehicle comprising:
    a housing having fluid storage apparatuses mounted thereto;
    a control unit carrying control elements for operation and monitoring of the vehicle;
    a structural assembly connecting the control unit to the housing at a distance from the housing to receive a vehicle operator therebetween; and
    propulsion means including a plurality of nozzles on the vehicle and connected with the storage apparatus under control of the control unit for applying force to the vehicle through 6 degrees of motion, including nozzles mounted on said control unit, and on said housing to provide selectively controlled combinations of thrust vectors.

2. The vehicle of claim 1 including stabilization means for automatically controlling the attitude of said vehicle, said stabilization means including momentum absorption means and means for applying fluid to said nozzles to apply stabilizing forces to said vehicle.

3. The vehicle of claim 1 including life support apparatus for the operator, the fluid in said storage device comprising a supply of a breathable oxygen mixture, and means for providing fluid from the same supply to both the nozzles and the life support apparatus, whereby the fluid may be used for (a) thrust, (b) breathing, and (c) as a coolant for equipment in the housing.

4. The vehicle of claim 1 wherein the structural assembly comprises:
a first member fixedly secured to the housing at a lower portion thereof and extending downwardly and forwardly therefrom in a direction relative to a vehicle operator; and
a second member pivotally connected to the downward and forward end of the first member, and extending upwardly and forwardly therefrom, said second member having an enlarged laterally extending end portion.

5. The vehicle of claim 1 wherein the structural assembly is bifurcated with one furcation thereof extending from either side of said housing, whereby it will extend on either side of an operator carried therebetween, said control unit having a portion on each of said furcations.

6. The vehicle of claim 1 wherein said stabilization means comprises a stabilization orientation system having gyro pairs to sense vehicle rotations and to control such vehicle rotations.

7. The vehicle of claim 1 wherein said housing has a forward wall surface contoured to receive the back of the vehicle operator, including a lower portion of relatively small curvature, an upper section of greater curvature, and upper forwardly projecting corner portions to receive the shoulders of the vehicle operator, and said structural assembly comprises a rigid hollow member adapted to seat a vehicle operator thereon and extending from the forward lower portion of said housing;
a foot support for the vehicle operator removably fixed to said structural assembly and extending downwardly therefrom; and
a seat shaped to receive the vehicle operator, removably mounted on said structural assembly.

8. The vehicle of claim 1 wherein said control unit comprises:
a support secured to and upstanding from a midsection of the forward end of said structural assembly;
a display panel carried by the support and extending laterally on either side thereof, said display panel including a plurality of control switches mounted thereon; and
a pair of control handles mounted to the forward end portion of said structural assembly and extending therefrom toward the laterally extending portions of the display panel.

9. The vehicle of claim 1 including:
life support means for vehicle operator life support secured to the housing and including means for connection with an astronaut suit; and
means connecting the life support means with said fluid storage device for providing the astronaut suit with a breathable atmosphere.

10. The vehicle of claim 9 wherein said fluid storage apparatus comprises:
several containers disposed about said housing and connected thereto;
distribution means, mounted in said housing and connected to said propulsion means and said life support means, for distributing the fluid to said propulsion means and for distributing the fluid to said life support means; and
connecting means for connecting said fluid storage device to said distribution means through openings in said housing to allow fluid flow.

11. The vehicle of claim 5 wherein said control unit comprises:
a support secured to each of the forward end portions of said bifurcated structural assembly;
a display meter carried by each of said supports, and said supports including a plurality of control switches mounted thereon;
a control handle mounted on and upstanding from each of said supports; and
means connecting the control handles and said propulsion means with said fluid storage apparatus to provide selectively controlled combinations of thrust vectors to said vehicle.

12. A vehicle comprising:
a housing adapted to be arranged at the back of an astronaut;
means for vehicle attitude control mounted in the housing;
a vehicle control unit spaced forwardly of the housing for reception of an astronaut therebetween;
means fixedly connecting the control unit to the housing; and
expulsion nozzles in said control unit and in said housing.

13. The vehicle set forth in claim 12 wherein the means for connecting the control unit with the housing comprises structural means connected at one end to a lower portion of the housing and at the other end to the control unit.

14. A vehicle comprising:
a housing adapted to be arranged at the back of an astronaut;
means for vehicle attitude control mounted in the housing;
a vehicle control unit spaced forwardly of the housing for reception of an astronaut therebetween;
means fixedly connecting the control unit to the housing;
a container of pressurized fluid secured to the housing and a plurality of fluid expulsion nozzles mounted on the housing and on the control unit to provide translational thrust along three axes and rotational torque about three axes;
means for flowing fluid from the container to the nozzles; and
means carried on the control unit and operable by the astronaut for controlling the flow of fluid from the container to the nozzles.

15. The vehicle of claim 14 including means responsive to said vehicle attitude control for controlling flow of fluid to the nozzles.

16. The vehicle of claim 15 including means on the control unit and operable by an astronaut for controlling the vehicle attitude.

17. The vehicle set forth in claim 14 wherein:
said housing has a rebated lower portion; and including a plurality of fluid storage devices mounted on said housing including a first fluid storage device partially contained within the rebated portion and a pair of lateral fluid storage devices symmetrically disposed at the sides of the lower portion of the housing.

18. A vehicle comprising:
a housing adapted to be arranged at the back of an astronaut;
means for vehicle attitude control mounted in the housing;
a pair of extension members adapted to extend on opposite sides of the astronaut and pivotally connected to the sides of the housing and extending forwardly therefrom; and
each of said extension members being disposed to pivot independently of each other with respect to said housing.

19. A vehicle as set forth in claim 18 including:
a body support member adapted to receive an astronaut connected at one end to the lower front midsection of the housing and extending forwardly therefrom; and
control handles attached to a front end of the extension members whereby the astronaut can command rotations or translations;
said members being pivotally connected to the housing about axes that substantially extend from side to side of the housing adjacent the bottom thereof to permit the forward ends of the extension members to fold toward or away from the top of the housing.

20. A vehicle comprising:
a housing adapted to be arranged at the back of an astronaut;
means for vehicle attitude control mounted in the housing;
extension members pivotally connected to the sides of the housing and extending forwardly therefrom;

a gas container secured to the housing;

a plurality of expulsion nozzles in said housing and in said extension members;

means responsive to the attitude control means for controlling gas flow from the container to the nozzles to control vehicle attitude;

means on the extension members for manually operating said vehicle attitude control; and means on the extension members for manually controlling gas flow from the containers to the nozzles.

21. A vehicle comprising:

a housing having a recessed lower rear portion and a forward wall surface contoured to receive the back of a vehicle operator;

storage means for fluid storage comprising at least one container of pressurized breathable gas partially contained within said recessed lower rear portion and detachably connected thereto;

a control unit having control elements for operating said vehicle;

a structural assembly connecting said control unit to said housing, said structural assembly being secured to said housing at a lower portion thereof, and said control unit being secured to the forward end of said structural assembly;

propulsion means for providing 6 degrees of motion of the vehicle, said propulsion means comprising a plurality of fluid expulsion nozzles mounted on said housing and on said control unit, said nozzles and said control elements being operatively connected to said fluid storage means;

stabilization means in said housing for automatically controlling the attitude of said vehicle, said stabilization means including means for automatically controlling gas flow from said storage means to said fluid expulsion nozzles to apply stabilizing forces to said vehicle;

life support means for vehicle operator life support secured to said housing and connected with said fluid storage means for providing the vehicle operator with a breathable atmosphere;

distribution means, mounted in said housing for distributing the gas to said propulsion means and for distributing gas to said life support means; and connecting means for connecting said fluid storage means to said distribution means through openings in said housing to allow fluid flow.

22. The vehicle of claim 21 wherein:

said structural assembly includes a first member fixedly secured to the housing at a lower portion thereof and extending downwardly and forwardly therefrom in a direction relative to a vehicle operator;

a second member pivotally connected with the downward and forward end of the first member, and extending upwardly and forwardly therefrom, said second member having an enlarged laterally extending end portion;

said control unit includes a support secured to and upstanding from a midsection of the enlarged portion of the second member of said structural assembly;

a display panel by the support and extending laterally on either side thereof, said display panel including a plurality of control switches mounted thereon;

a pair of control handles mounted to the forward end portion of said structural assembly and extending therefrom toward the laterally extending portions of the display panel;

said fluid storage means including a first tank partially contained within said recessed rear portion of said housing and a pair of lateral containers symmetrically disposed about the lower rear portions of the housing and detachably connected thereto; and said vehicle further including:

a foot support for the vehicle operator, removably fixed to said structural assembly and extending downwardly therefrom; and a seat shaped to receive the vehicle operator, removably mounted on said structural assembly.

23. The vehicle of claim 21 wherein:

said structural assembly is bifurcated with one furcation thereof extending on either side of the vehicle operator adapted to be carried therebetween; and said control unit having a portion on each of said furcations including:

a support secured to each of the forward end portions of said furcations;

a display device carried by each of said supports, said supports including a plurality of control switches mounted thereon; and a control handle mounted on each of said supports, said control handles and said propulsion means being connected to and in operative association with said fluid storage, fluid distribution, and stabilization means to provide selectively controlled combinations of thrust vectors to said vehicle.